United States Patent

[11] 3,583,653

| [72] | Inventor | George N. Bliss |
| | | 8620 106th S.E., Renton, Wash. 98055 |
| [21] | Appl. No. | 758,486 |
| [22] | Filed | Sept. 9, 1968 |
| [45] | Patented | June 8, 1971 |

[54] DRIVE MEANS FOR DRUM LEVEL WIND MECHANISM
5 Claims, 8 Drawing Figs.

| [52] | U.S. Cl. | 242/158 |
| [51] | Int. Cl. | B65h 54/28 |
| [50] | Field of Search | 242/158 B, 158, 158.4; 74/37 |

[56] References Cited
UNITED STATES PATENTS

| 1,186,909 | 6/1916 | Huttelmaier | 242/158(B)UX |
| 1,753,503 | 4/1930 | Colman | 242/158(B)X |
| 2,084,733 | 6/1937 | Kahliff | 74/37UX |
| 3,029,957 | 4/1962 | Freeman et al. | 74/37X |

FOREIGN PATENTS

| 280,379 | 11/1914 | Germany | 242/158(B) |

*Primary Examiner*—Stanley N. Gilreath
*Attorney*—Seed, Berry & Dowrey

ABSTRACT: A level wind mechanism to guide cable onto a cable-receiving spool utilizing an endless chain and interconnecting rod to shuttle a cable-guiding carriage back and forth along the length of the spool. The drive mechanism powering the shuttle chain includes two chain and sprocket assemblies pivotable about a shuttle chain sprocket and about each other to permit the distance and position between a shuttle chain sprocket and an input shaft to be varied to accommodate adaption of the level wind to different spools.

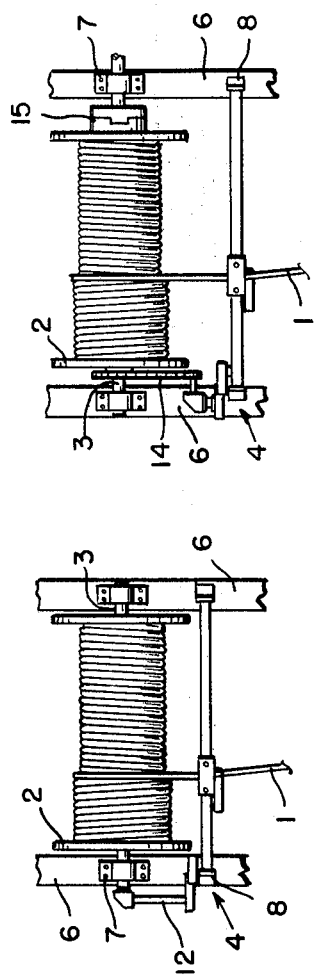
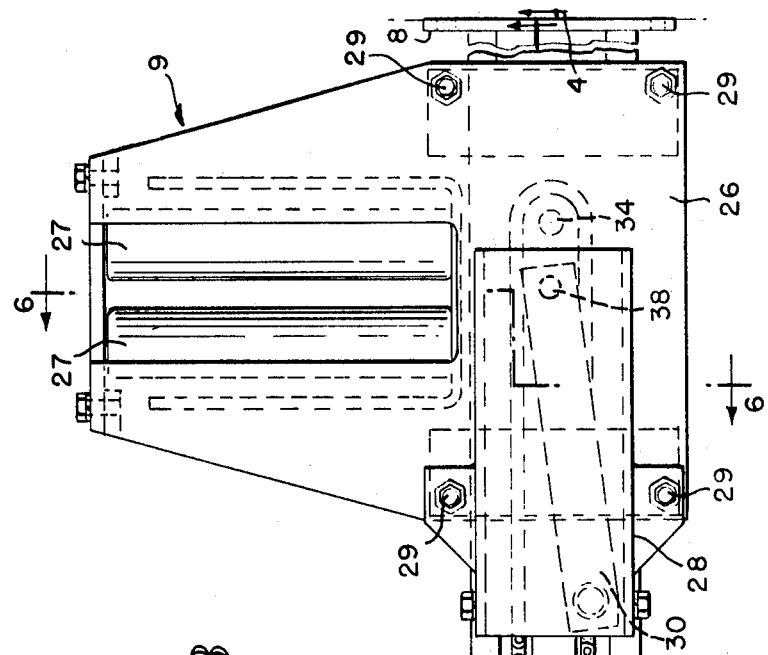
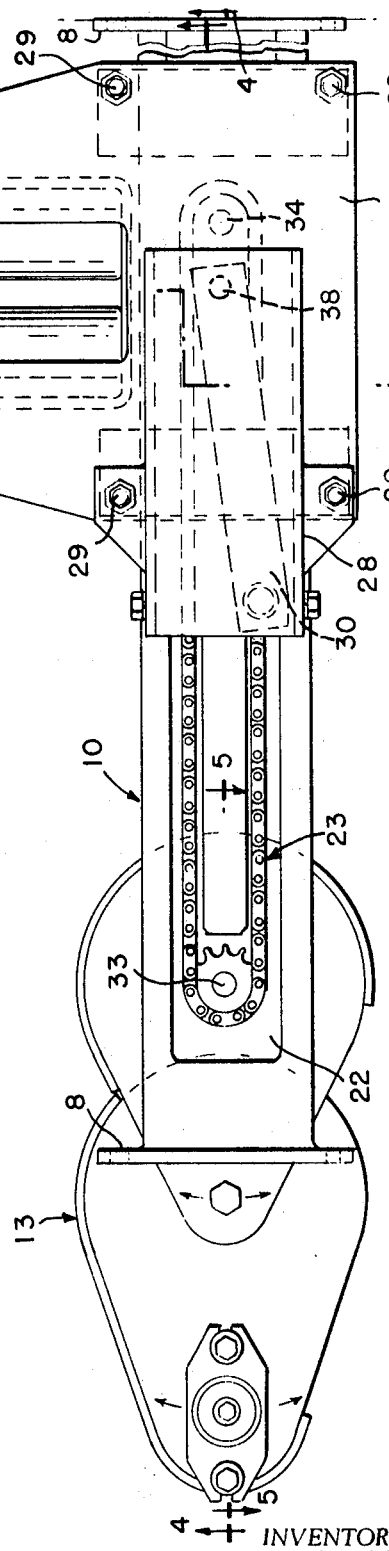

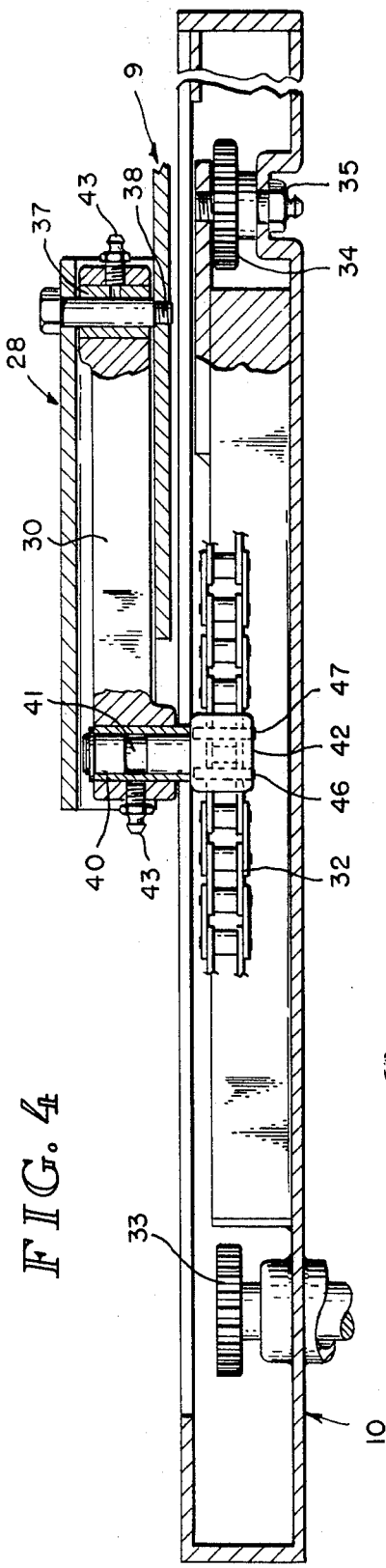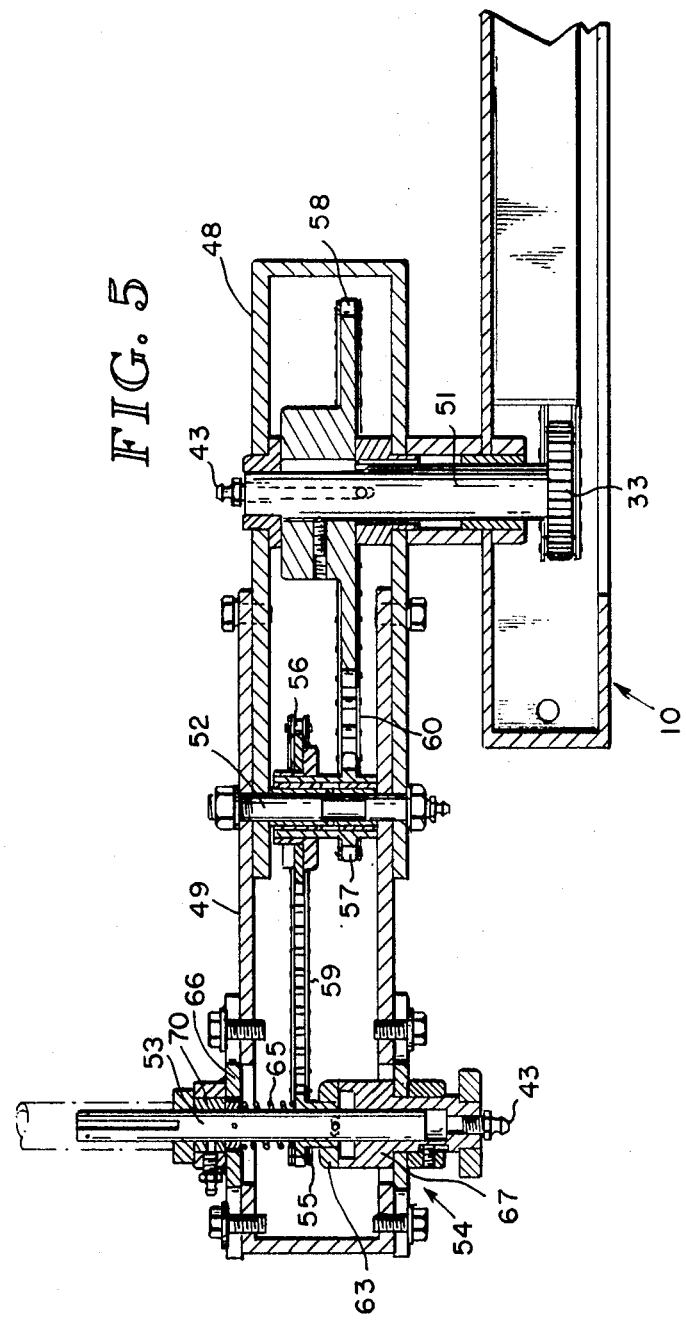

GEORGE N. BLISS
INVENTOR.

BY Seed, Berry & Dowrey

ATTORNEYS

DRIVE MEANS FOR DRUM LEVEL WIND MECHANISM

BACKGROUND OF THE INVENTION

The present invention relates to level wind apparatus used in combination with a power driven spool upon which a cable is wound. Specifically, the present invention relates to improved drive mechanism for shuttling a fair-lead back and forth along the length of a spool to obtain a proper lay of the cable on the spool.

Heretofore, a major design consideration in constructing level wind apparatus has been the development of drive mechanisms for moving the carriage guiding the cable, i.e. the fair-lead, back and forth along the length of the spool at a rate that permits the cable to be wound in a continuous layer along the length of the spool without overlapping adjacent segments of cable in the same layer. In drive mechanisms of the type utilizing an endless chain and interconnecting rod between the chain and carriage, reliability has not been as good as desired because of inadequate consideration of the connection between the rod and chain. Also, simple means are not always provided for disabling a drive mechanism to permit positioning of the carriage by hand. In addition, it has been necessary to tailor to a particular spool the drive mechanism between the spool and the mechanism propelling the carriage. The tailoring requirement commonly arises because of the particular drive apparatus available for coupling to a spool or environment of a spool. The environment or construction of the spool often necessitates positioning a level wind at a peculiar angle or distance relative to the spool or on one or the other side of the spool.

Accordingly, it is an object of the present invention to design an improved level wind mechanism. It is an object to provide level wind apparatus easily adapted for operation with a randomly selected spool. The present level wind mechanism is of the type wherein a carriage is moved reciprocally back and forth along a track by an endless chain arranged along the track in a longitudinal loop and coupled to the carriage by an interconnecting rod. The sprocket driving the endless chain is coupled to an adjustable drive assembly pivoted about the endless chain drive sprocket and itself. The adjustable assembly can be manipulated to change the distance from the drive sprocket to a power shaft driven by the spool and to change the location at which the drive sprocket is positioned relative to the power shaft. Therefore, it is another object of the present invention to devise an adjustable drive mechanism capable of transmitting rotary motion between two shafts positioned at random locations and distances from one another.

The present level wind mechanism with its adjustable drive assembly is versatile because it includes a clutch for controlling operation of the level wind. The clutch is a pin-type employing an improved pin and slot engagement mechanism. Accordingly, it is also an object of the invention to incorporate in an adjustable drive assembly an improved clutch mechanism for increasing reliability.

The reliability of the chain and interconnecting mechanism employed for driving the carriage is greatly improved in the present drive mechanism. Therefore, it is an object of the present invention to improve the connection between a chain and interconnecting rod drive mechanism. A yoke is attached to and parallels an entire chain link for distributing forces over a wide area. The yoke includes a pin pivoted in a sleeve in the interconnecting rod.

DESCRIPTION OF THE DRAWINGS

Other objects and features of the present invention will be apparent from a further reading of the description of the invention and from the drawings which are:

FIG. 1 is a plan view of the present level wind mechanism coupled to a cable-receiving spool and illustrating the adjustable drive assembly coupled to a first gear arrangement;

FIG. 2 is a plan view of the level wind and spool in FIG. 1 with the adjustable drive assembly coupled to a second gear arrangement and with the spool coupled to a clutch;

FIG. 3 is an enlarged, elevation view of the present level wind mechanism showing the adjustable drive mechanism positioned to a maximum length and at a horizontal angle;

FIG. 4 is a plan cross section view of the endless drive chain and interconnecting rod through which power is transmitted to the carriage taken along line 4—4 in FIG. 3;

FIG. 5 is a cross section plan view of the adjustable drive mechanism of the present invention taken along line 5—5 in FIG. 3;

DESCRIPTION OF THE INVENTION

Figure 6:
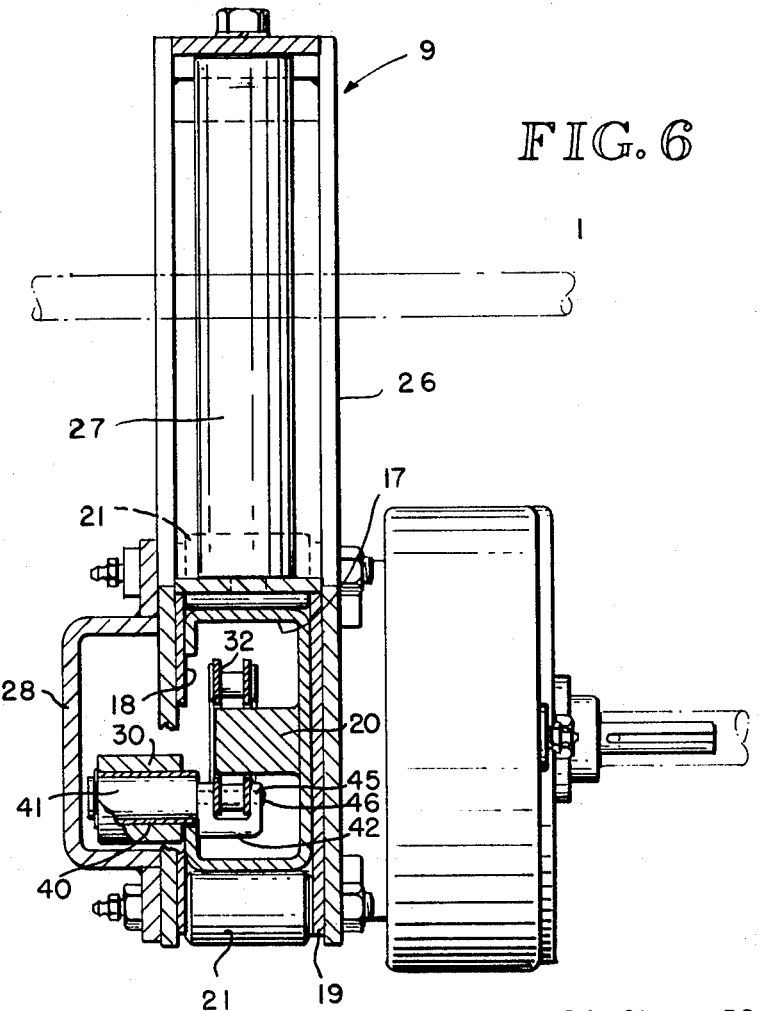
FIG. 6 is an end elevation view of the present level wind mechanism taken along line 6—6 in FIG. 3.

Referring to FIG. 1, cable 1 is wound upon spool 2 as the spool is rotated about axle 3 by an appropriate power source not shown. The reference numeral 4 indicates the level wind assembly of the present invention. The same reference numeral is used for elements common to the different figures. The spool axle 3 is journaled to a support frame 6 as indicated by the bearing bracket 7. The level wind 4 is also appropriately supported by the frame 6 as represented by mounts 8. The carriage 9 shuttles back and forth along track 10 laying the cable 1 in layers on the spool as indicated in FIGS. 1 and 2. The ratio of the drive mechanism coupling the carriage 9 to the spool axle 3 is such that the carriage moves along track 10 a distance equal to the width of the cable for every revolution of the spool. The rotation of the spool is translated into movement of the carriage by a drive train coupled to axle 3 and the adjustable drive assembly 13 of the level wind mechanism 4. FIG. 2 illustrates the level wind assembly 4 of the present invention having its adjustable drive train 13 adjusted to accommodate interconnection with a second type of drive train 14. FIG. 2 with clutch 15 coupled to the spool illustrates a spool environment compelling the level wind mechanism to be alerted in order to operate with the spool.

The level wind mechanism of the present invention includes a track, a carriage slidably supported on the track for guiding the cable along the axis of rotation of the spool, an endless chain and sprocket assembly mounted on the track, linking means coupled to the endless chain and carriage for shuttling the carriage back and forth along the track, gear means connected to the shaft of the spool on which the cable is wound, and adjustable drive means for coupling the gear means to the chain and sprocket assembly while positioned at a random location and distance from each other.

Track 10 is comprised of C-channel 17 (FIG. 6) and sideplates 18 and 19. The track 10 also includes bar 20 mounted internal to the C-channel along its centerline. Bar 20 is available to support the weight of chain 32. The sideplates 18 and 19 extend above and below the height of the C-channel forming a through or groove with the top and bottom of the C-channel in which rollers 21 on carriage 9 travel. Sideplate 18 has an opening 22 cut therein as indicated in FIG. 3 exposing the chain and sprocket assembly 23. The opening permits access to the chain for maintenance and permits interconnecting rod 30 to connect the chain and carriage. It should be noted that the construction of the C-channel as well as the construction of other elements of the level wind assembly can be readily assembled in a mirror image of that shown in FIG. 6 such as to accommodate coupling to a spool on the opposite side of that shown in FIGS. 1 and 2.

Again referring to FIG. 3, carriage 9 is constructed from frame 26 in which is journaled the rollers 27. Rollers 27 are journaled on a vertical axis to assist the movement of cable 1 therethrough as illustrated in phantom in FIG. 6. The cover 28 is connected to the carriage frame by fasteners 29 which also serve to journal the four carriage rollers 21 on which the carriage rides along track 10. Cover 28 is a shield for interconnecting rod 30.

The chain and sprocket assembly 23 drives the carriage 9 back and forth along track 10 by way of interconnecting rod 30. Assembly 23 is shown in FIGS. 3, 4 and 6. Shuttle chain 32 is a link chain carried by drive sprocket 33 and idle sprocket 34. The drive and idle sprockets are journaled for rotation in the track 10 as indicated in FIG. 4. The position of the idle sprocket 34 relative to the drive sprocket determines the length of shuttle chain 32 and is chosen to establish the length of travel of the carriage required for a particular spool. The bearing bracket 35 for the idle sprocket is appropriately indented in the side of track 10 to permit the carriage to pass over it without encountering interference.

FIG. 4 illustrates the pivotal connection of the interconnecting rod 30 to the chain 32 and carriage 9. Rod 30 is pivotally connected to the carriage by sleeve 37 rigidly mounted on rod 30 and slidably positioned over the pin 38 rigidly coupled to the carriage 9. Rod 30 is pivotally connected to the chain 32 by virtue of sleeve 40 rigidly mounted in the rod 30 and slidably positioned over pin 41 rigidly connected to yoke 42. Grease fittings 43 are provided on the pivotal mounts at both ends of rod 30 and elsewhere for lubrication of the pivot points.

Yoke 42 straddles chain 32 with legs 45 overlapping each side of the chain. Yoke pins 46 and 47 extend between the yoke legs 45 through the joints in the link chain 32 as illustrated in FIGS. 4 and 6. The carriage pivot end of rod 30 remains at a constant elevation as the chain travels about the sprockets 33 and 34. The yoke end of rod 30 during one-half of the cycle of rotation of chain 32 rides at an elevation above bar 20, and rides the remaining portion of the cycle below bar 20. As the chain rotates about the drive and idle sprockets the rod 30 pushes and pulls the carriage 9 back and forth along the track 10.

Referring now to FIG. 5, the adjustable drive train 13 is coupled to and supported by track 10. The adjustable drive train includes frames 48 and 49, output shaft 51 (the same shaft on which drive sprocket 33 is journaled for rotation) a common shaft 52 and input shaft 53. Input shaft 53 is coupled to a power shaft in drive means 12 or 14. Also included are the clutch 54, clutch sprocket 55, intermediate sprockets 56 and 57, and output shaft sprocket 58. Chain 59 is carried by the clutch and intermediate sprockets 55 and 56. Chain 60 is carried by intermediate and output sprockets 57 and 58. Rotation of the input shaft 53 by a power shaft is transmitted through the adjustable drive train 13 to the drive sprocket 33.

Adjustable drive assembly 13 is made longer or shorter by pivoting frame 48 about output shaft 51 and frame 49 about the hinge or common shaft 52. The two frames are pivoted or rotated together to a chosen angle so as to mate input shaft 53 with a particular drive mechanism coming from the spool. A drive mechanism coming from the spool (such as drive trains 12 and 14) is designed to fit the physical character and environment of a spool. No stringent requirements are placed on the design of drive trains such as 12 and 14 because the adjustable drive assembly can be adapted to random angles and distances.

Clutch 54 is of a dog-type or pin-type clutch having clutch pin 61 extending through input shaft 53. Collar 63 rides on the input shaft 53 and has a slot 64. Collar 63 is integrally connected with clutch sprocket 55 forming the output side of clutch 54 while shaft 53 and pin 61 form the input side of clutch 54. Spring 65 biases the sprocket and collar such that pin 61 remains engaged with slot 64.

Figure 7:
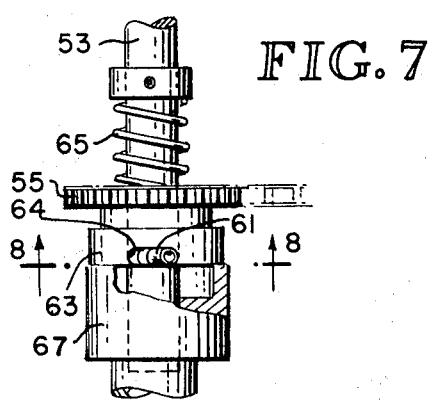
FIG. 7 is an enlarged view of the clutch employed in the present level wind mechanism shown in engaged position.
Figure 8:
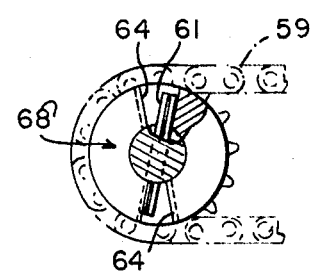
FIG. 8 is an elevation cross section view of the clutch of the present invention taken along line 8—8 in FIG. 7.

The input shaft 53 is 142 to frame 49 by bearing 70 supported by brackets 66. Bearing 67 is slidably mounted for movement along the axis of rotation of input shaft 53 thereby permitting the clutch to be disengaged by forcing the bearing 67 against collar 63 to slide collar 63 releasing pin 61 from slot 64. Removal of a hand-applied force from bearing 67 permits spring 65 to urge collar 63 back into engagement with pin 61 thereby engaging the clutch. The shape of the slot 64 and collar 63 is designed to give positive engagement of pin 61 with collar 63 thereby transmitting the rotation of input shaft 53 to the clutch sprocket 55. The spring 65 maintains this normal engagement between the pin 61 and collar 63. Details of the clutch 54 are shown in FIGS. 7 and 8. FIG. 8 shows a cross section of input shaft 53 with the clutch pin 61 embedded therein. Slots 64 are designed to provide the maximum contact area between pin 61 and collar 63. The slot is shaped at the ends in a circular manner to approximate the circular cross section of the pin. This shape allows the full surface of the pin to mate with the full surface of the slot. The stress exerted on the pin is therefore distributed over the maximum area of the pin reducing the normal shear forces experienced by the pin. Also the curved ends of the slot 64 (best seen in FIG. 5) provide positive engagement of the pin with the collar.

Slot 64 is formed by drilling two holes through the collar at an acute angle from each other and then drilling the remainder of the material between the two holes. The holes or drill bores through the collar are spaced from surface 68 so the circumference of the bores are tangent to surface 68. This position of the bores provides the curved ends for slot 64.

It is believed that the invention will have been clearly understood from the foregoing detailed description of my now-preferred illustrated embodiment. Changes in the details of construction may be resorted to without departing from the spirit of the invention and it is accordingly my intention that no limitations be implied and that the hereto annexed claims be given the broadest interpretation to which the employed language fairly admits.

The embodiments of the invention in which I claim an exclusive property or privilege are defined as follows:

1. A level wind mechanism for guiding cable onto a spool comprising
- a track supported laterally from and parallel to the axis of rotation of the spool,
- a carriage slidably supported on said track for guiding the cable along the axis of rotation of the spool as the cable is wound onto the spool,
- an endless shuttle chain carried by drive and idle sprockets journaled in said track through which power is transmitted to slide the carriage on the track,
- interconnecting means for coupling said chain to said carriage for moving said carriage back and forth along the track upon rotation of said drive sprocket.
- drive means including a power shaft for coupling to a spool for rotating said power shaft upon rotation of the spool, and
- adjustable articulated drive means coupled to said power shaft and drive sprocket, including means to secure said articulated drive means in either a linear or articulated condition whereby the mechanism is useable in a variety of structures wherein the distance and position between the power shaft and the drive sprocket vary.

2. The mechanism of claim 1 wherein said interconnecting means includes
- a rod pivotally connected at one end to said carriage,
- a yoke having legs straddling a link in said chain and coupled thereto, and
- a yoke pin rigidly connected to said yoke and pivotally connected to said rod at another end thereof.

3. The mechanism of claim 1 wherein said track includes
- a C-channel having first and second plates connected to opposite sides thereof extending above and below the height of said C-channel forming a groove, and a bar connected internal to said C-channel positioned between said drive and idle sprockets journaled in said C-channel permitting said shuttle chain to travel above and below said bar to support a portion of said chain as it travels about said bar on said sprockets.

And wherein said carriage includes a frame having two vertically journaled rollers for guiding the cable therebetween, and four horizontally journaled rollers positioned on the grooves above and below said C-channel to assist movement of said carriage along said track.

4. The mechanism of claim 1 wherein said adjustable drive means includes
first and second frames hinged together on a common shaft, an output shaft journaled in said first frame,
sprockets connected to said common and output shafts,
a clutch having input and output sides mounted on said second frame for coupling to said power shaft at said input side and having a sprocket on said output side,
a first chain carried by said sprockets on the output side of said clutch and on said common shaft, and
a second chain carried by said sprockets on said common shaft and said output shaft, whereby rotation of said power shaft causes rotation of said output shaft when said clutch is engaged.

5. The mechanism of claim 4 wherein said clutch is of the type wherein a pin inserted through a shaft is biased into engagement with radial slots in a collar slidably mounted on the shaft, said slots defined by two radial bores through said collar at acute angles to each other and tangent to radial surfaces of said collar and infinite similar bores at positions therebetween.